United States Patent
Busaba et al.

(10) Patent No.: US 10,365,929 B2
(45) Date of Patent: *Jul. 30, 2019

(54) SPIN LOOP DELAY INSTRUCTION

(71) Applicant: INTERNATIONAL BUSINESS MACHINES CORPORATION, Armonk, NY (US)

(72) Inventors: Fadi Y. Busaba, Poughkeepsie, NY (US); Christian Jacobi, West Park, NY (US); Anthony Saporito, Highland, NY (US); Eric M. Schwarz, Gardiner, NY (US); Timothy J. Slegel, Staatsburg, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/810,826

(22) Filed: Nov. 13, 2017

(65) Prior Publication Data

US 2018/0260228 A1 Sep. 13, 2018

Related U.S. Application Data

(63) Continuation of application No. 15/453,265, filed on Mar. 8, 2017.

(51) Int. Cl.
*G06F 9/30* (2018.01)
*G06F 9/46* (2006.01)
(Continued)

(52) U.S. Cl.
CPC .......... *G06F 9/3836* (2013.01); *G06F 9/3009* (2013.01); *G06F 9/30072* (2013.01);
(Continued)

(58) Field of Classification Search
CPC .. G06F 9/3836; G06F 9/30072; G06F 9/3016; G06F 9/3802; G06F 9/4881;
(Continued)

(56) References Cited

U.S. PATENT DOCUMENTS 3,909,800 A * 9/1975 Recks .................. G06F 9/24
710/5
6,622,189 B2 9/2003 Bryant et al.
(Continued)

OTHER PUBLICATIONS

Anastopoulos, Nikos et al., "Facilitating Efficient Synchronization of Asymmetric Threads on Hyper-Threaded Processors," IEEE International Symposium on Parallel and Distributed Processing, Apr. 2008, pp. 1-8.
(Continued)

*Primary Examiner* — Daniel H Pan
(74) *Attorney, Agent, or Firm* — William A. Kinnaman Jr., Esq.; Blanche E. Schiller, Esq.; Heslin Rothenberg Farley & Mesiti P.C.

(57) ABSTRACT

A Spin Loop Delay instruction. The instruction has a field associated therewith that indicates one or more conditions to be checked. Dispatching of the instruction is initially delayed. The instruction is subsequently dispatched based on a timeout, provided the instruction has not been previously dispatched based on meeting at least one condition of the one or more conditions to be checked.

9 Claims, 9 Drawing Sheets

(51) Int. Cl.
*G06F 9/38* (2018.01)
*G06F 9/48* (2006.01)
*G06F 9/32* (2018.01)

(52) U.S. Cl.
CPC ........ *G06F 9/30079* (2013.01); *G06F 9/3016* (2013.01); *G06F 9/30065* (2013.01); *G06F 9/30189* (2013.01); *G06F 9/325* (2013.01); *G06F 9/381* (2013.01); *G06F 9/4806* (2013.01); *G06F 9/4843* (2013.01); *G06F 9/4881* (2013.01)

(58) Field of Classification Search
CPC .. G06F 9/4806; G06F 9/4843; G06F 9/30145; G06F 9/30167; G06F 9/30189; G06F 9/30196; G06F 9/30058; G06F 9/30065; G06F 9/325; G06F 9/381; G06F 9/30079; G06F 9/3009
USPC .................................................. 712/207–213
See application file for complete search history.

(56) References Cited

U.S. PATENT DOCUMENTS

| | | | |
|---|---|---|---|
| 6,694,425 B1* | 2/2004 | Eickemeyer | G06F 9/3851 712/216 |
| 7,165,254 B2 | 1/2007 | Yoshida | |
| 7,395,418 B1 | 7/2008 | Caprioli et al. | |
| 8,078,843 B2 | 12/2011 | Alexander et al. | |
| 8,725,958 B2 | 5/2014 | Takata | |
| 9,223,637 B1 | 12/2015 | Kessler | |
| 9,262,233 B1 | 2/2016 | Reed et al. | |
| 9,304,776 B2* | 4/2016 | Dice | G06F 9/30079 |
| 9,378,069 B2 | 6/2016 | Chiang et al. | |
| 9,384,049 B2 | 7/2016 | Rogers et al. | |
| 2006/0179213 A1* | 8/2006 | Brittain | G06F 13/161 711/105 |
| 2006/0277447 A1* | 12/2006 | Martin | G06F 13/4059 714/55 |
| 2007/0061552 A1 | 3/2007 | Chang | |
| 2008/0034190 A1 | 2/2008 | Rodgers et al. | |
| 2013/0212341 A1* | 8/2013 | Tardif | G11B 20/10046 711/154 |
| 2016/0019063 A1 | 1/2016 | Rappoport et al. | |
| 2016/0216966 A1 | 7/2016 | Dice et al. | |
| 2018/0260226 A1* | 9/2018 | Busaba | G06F 9/3836 |

OTHER PUBLICATIONS

Curran, B.W. et al., "The IBM z13 Multithreaded Microprocessor," IBM Journal of Research and Development, vol. 59, No. 4/5, Jul./Sep. 2015, pp. 1:1-1:13.
IBM, "Power ISA—V2.07B," Apr. 2015, pp. 1-1527.
IBM, "z/Architecture—Principles of Operation," SA22-7832-10, Eleventh Edition, Mar. 2015, pp. 1-1732.
Mel, Peter and Tim Grance, "The NIST Definition of Cloud Computing," National Institute of Standards and Technology, Information Technology Laboratory, Special Publication 800-145, Sep. 2011, pp. 1-7.
Yi, et al., "Nb-GCLOCK: A Non-blocking Buffer Management Based on the Generalized Clock,"ICDE Conference 2010, Mar. 2010, pp. 745-756.
Zhang et al., "Recalling Instructions From Idling Threads to Maximize Resource Utilization for Simultaneous Multi-Threading Processors," Computers and Electrical Engineering, vol. 39, Issue 7, Oct. 2013, pp. 2031-2044.
Busaba et al., "Spin Loop Delay Instruction," U.S. Appl. No. 15/453,265, filed Mar. 8, 2017, pp. 1-41.
List of IBM Patents and/or Patent Applications Treated as Related, dated Jan. 12, 2018 pp. 1-2.
Busaba et al., "Spin Loop Delay Instruction," U.S. Appl. No. 16/212,157, filed Dec. 6, 2018, pp. 1-41.
List of IBM Patents and/or Patent Applications Treated as Related, dated Mar. 14, 2019, pp. 1-2.

* cited by examiner

SPIN LOOP DELAY INSTRUCTION

CROSS-REFERENCE TO RELATED APPLICATIONS

This application is a continuation of co-pending U.S. patent application Ser. No. 15/453,265, filed Mar. 8, 2017, entitled "SPIN LOOP DELAY INSTRUCTION," which is hereby incorporated herein by reference in its entirety.

BACKGROUND

One or more aspects relate, in general, to processing within a computing environment, and in particular, to facilitating such processing.

Often, within a computing environment, a program needs to wait on asynchronous events to complete, which is performed by repeatedly testing for the conditions to be met. In one particular example, 128 conditions are tested in a continuous loop that tests whether a condition has been met. For instance, a number of conditions, such as three, are tested and then the processing loops back to the top to continue testing another set of conditions in a spin loop. The problem with this testing is that in certain environments, such as a multi-threaded environment, the thread executing the spin loop may be taking resources away from another thread in the multi-threaded environment trying to complete the work for which the first thread was testing.

Additionally, this affects thread balancing in that the waiting thread may be given priority when it is just spinning and waiting. It appears that many instructions are executing very fast, but in fact, no real work is getting done, and resources are being taken from the other thread. These resources include, for instance, instruction buffer or streaming buffer width, issue queue entries, store tags, mapper registers, general purpose registers, and issue queue slots.

Also, debug is difficult, since the spin loop typically takes up the last 256 instructions executed and leaves no instructions in the trace array of the other thread.

SUMMARY

Shortcomings of the prior art are overcome and additional advantages are provided through the provision of a computer-implemented method of facilitating processing within a computing environment. The method includes, for instance, decoding an instruction defined to be delayed. The instruction has a field associated therewith that indicates one or more conditions to be checked. Dispatching of the instruction is delayed. The instruction is dispatched based on a timeout, provided the instruction has not been previously dispatched based on meeting at least one condition of the one or more conditions to be checked.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with an aspect of the present invention, a capability is provided to delay dispatching of an instruction until one or more selected conditions (e.g., the most popular conditions tested in firmware) is met or until a timeout, such as an amount of a time delay has been reached. For instance, an instruction, referred to herein as Spin Loop Delay (SPNDLY), is provided that checks for the selected conditions. If one or more of the selected conditions is satisfied, the instruction is allowed to dispatch and complete. If none of the selected conditions is satisfied, the instruction stalls in the front of the instruction pipeline in, e.g., the decode unit, until one of the selected conditions is met or a preset delay, such as 1024 processing cycles, is reached, as one example. Since the SPNDLY instruction when waiting for a condition to be satisfied stalls in dispatch, it allows other thread(s) of the environment to claim the resources in further stages of the instruction pipeline.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

An embodiment of a computing environment to incorporate and use one or more aspects of the present invention is described with reference to FIG. 1A. In one example, the computing environment is based on the z/Architecture, offered by International Business Machines Corporation, Armonk, N.Y. One embodiment of the z/Architecture is described in "z/Architecture Principles of Operation," IBM Publication No. SA22-7832-10, March 2015, which is hereby incorporated herein by reference in its entirety. Z/ARCHITECTURE is a registered trademark of International Business Machines Corporation, Armonk, N.Y., USA.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE is a registered trademark of International Business Machines Corporation, Armonk, N.Y., USA.

The computing environment may also be based on other architectures, including, but not limited to, the Intel x86 architectures. Other examples also exist.

Figure 1A:
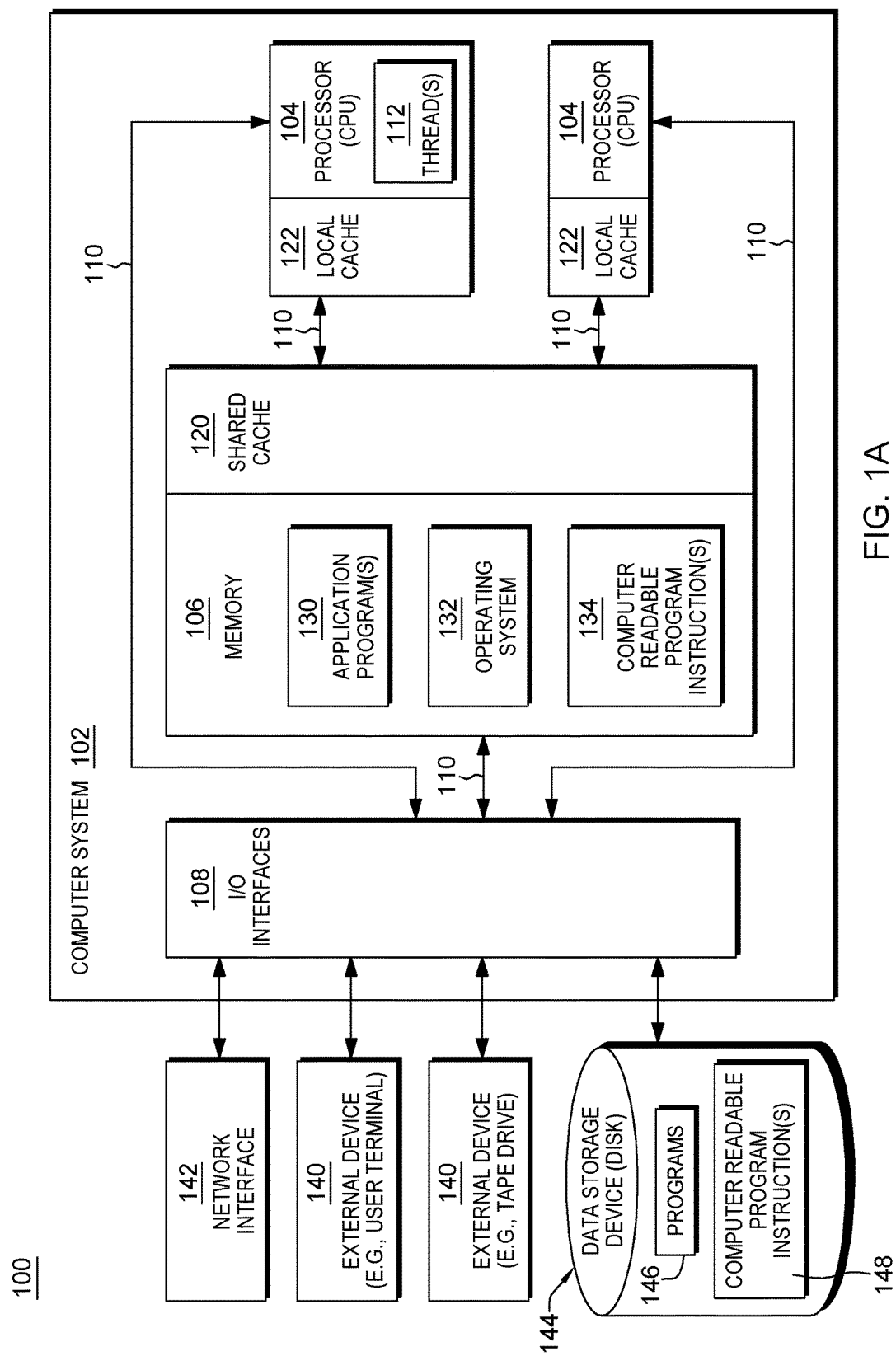
FIG. 1A depicts one example of a computing environment to incorporate and use one or more aspects of the present invention.

As shown in FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (referred to as main memory or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

One or more of processors 104 may be a multi-threading processor, in which the processor executes multiple (e.g., two) threads 112.

Memory 106 may include, for instance, a cache 120, such as a shared cache, which may be coupled to local caches 122 of processors 104. Further, memory 106 may include one or more programs or applications 130, an operating system 132, and one or more computer readable program instructions 134. Computer readable program instructions 134 may be configured to carry out functions of embodiments of aspects of the invention.

Computer system 102 may also communicate via, e.g., I/O interfaces 108 with one or more external devices 140, one or more network interfaces 142, and/or one or more data storage devices 144. Example external devices include a user terminal, a tape drive, a pointing device, a display, etc. Network interface 142 enables computer system 102 to communicate with one or more networks, such as a local area network (LAN), a general wide area network (WAN), and/or a public network (e.g., the Internet), providing communication with other computing devices or systems.

Data storage device 144 may store one or more programs 146, one or more computer readable program instructions 148, and/or data, etc. The computer readable program instructions may be configured to carry out functions of embodiments of aspects of the invention.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
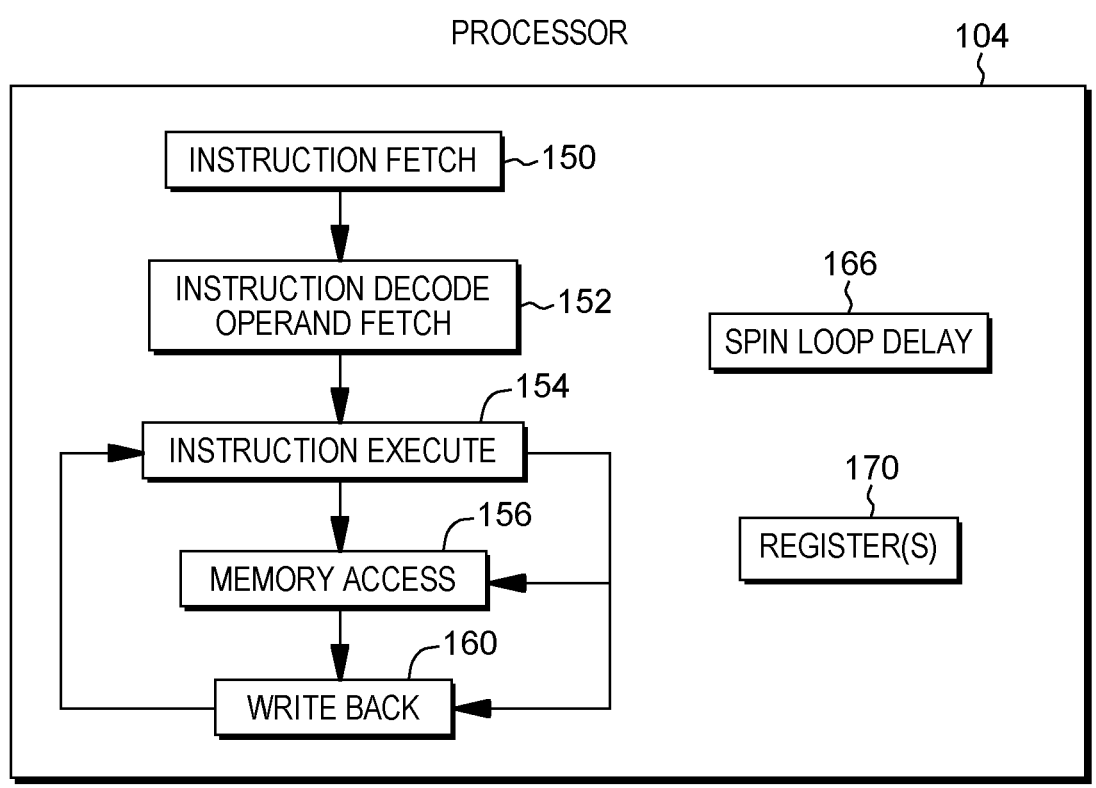
FIG. 1B depicts further details of the processor of FIG. 1A, in accordance with an aspect of the present invention.

Further details regarding one example of processor 104 are described with reference to FIG. 1B. Processor 104 includes a plurality of functional components used to execute instructions. These functional components include, for instance, an instruction fetch component 150 to fetch instructions to be executed; an instruction decode unit 152 to decode the fetched instructions and to obtain operands of the decoded instructions; instruction execution components 154 to execute the decoded instructions; a memory access component 156 to access memory for instruction execution, if necessary; and a write back component 160 to provide the results of the executed instructions. One or more of these components may, in accordance with an aspect of the present invention, be used to execute the Spin Loop Delay instruction 166, described further below.

Processor 104 also includes, in one embodiment, one or more registers 170 to be used by one or more of the functional components.

Figure 1C:
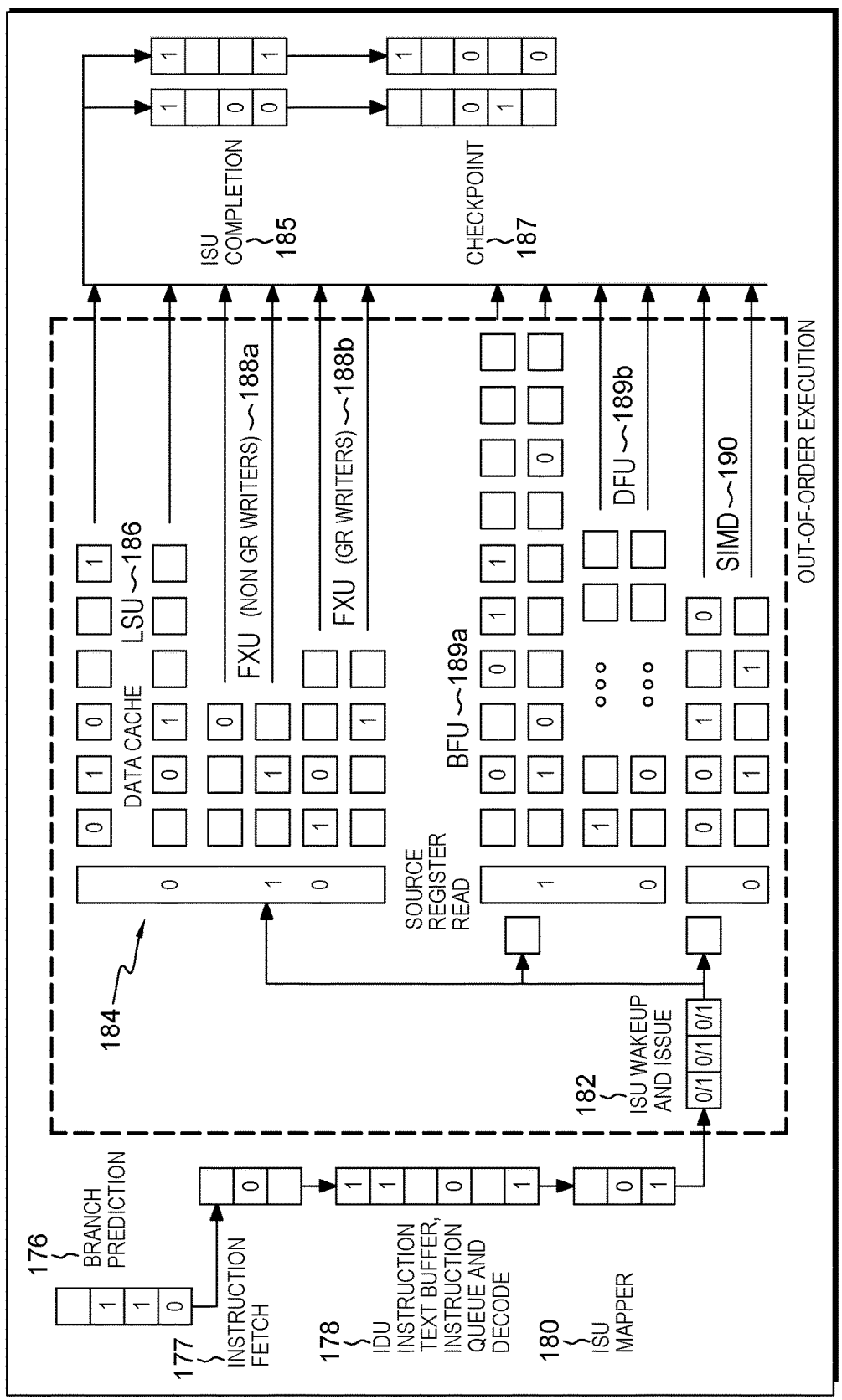
FIG. 1C depicts one example of a processor pipeline and simultaneous multi-threading processing, in accordance with an aspect of the present invention.

As indicated above, in one embodiment, a processor may be a multi-threaded processor. Therefore, further details associated with simultaneous multi-threading are described with reference to FIG. 1C. In one implementation, front-end instruction processing, which includes, for instance, branch prediction unit pipeline stages 176, instruction fetch pipeline stages 177, IDU (instruction decode unit) stages 178, and ISU (instruction sequencing unit) mapper stages 180, executes instructions in program order. The ISU issue stages 182 and execution unit pipeline stages 184 execute instructions and micro-operations out-of-program order; and the back-end processing completion 185 and checkpoint 187 stages operate in program order. FIG. 1C provides a typical snapshot of thread 0 and thread 1 execution in these pipeline stages.

In a given cycle, branch prediction can predict both branch directions and targets for just one thread. In the next cycle, it can switch to provide predictions for the other thread. Similarly, in a given cycle, the instruction text for just one thread is accessed from the instruction cache and in the next cycle, instruction fetch can switch to the other thread. The branch prediction structures and instruction cache are shared by both threads. The physical entries in the branch prediction buffer structures are dynamically allocated to thread 0 or thread 1. However, once a prediction is installed in a buffer it can be used by either thread.

The instruction text buffer and instruction queue in the IDU are implemented differently. In one example, they are statically partitioned into two halves (e.g., top half dedicated to thread 0 and bottom half dedicated to thread 1); this is to maintain instructions in order. However, similar to branch prediction and instruction fetch, the decoding and dispatching pipeline stages operate on one thread at a time, and these pipeline stages can alternate between threads each cycle.

The issue and execution stages differ from the front end of the pipe by allowing two threads to be processed concurrently. For example, a load instruction from thread 0 can issue to load/store unit 1 (LSU) 186, and a store instruction from thread 1 can issue to load/store unit 0 simultaneously. Likewise, a fixed point instruction from thread 0 can issue to non GR-(general purpose register) writing fixed point unit 0 (FXU) 188a, and a fixed point instruction from thread 1 can issue to GR-writing fixed point unit 1 (FXU) 188b, simultaneously. The issue queue and global completion tables are dynamically shared by threads similar to the instruction cache; however, the entries in these structures are dedicated to one thread until the entry is de-allocated when the associated instructions complete.

The general purpose and vector/floating point register files, data cache, store forwarding cache, and translation lookaside buffers (TLBs) are also dynamically shared by threads. The entries in the register files are dedicated to a thread until the physical register entry is deallocated, at which time it can be reallocated to either thread. The TLBs are similarly tagged with thread IDs, so one thread's translation results cannot be used, in one example, by the other thread. The data cache allows data fetched by one thread to be used by the other thread. The fixed point and floating point execution units (e.g., BFU-binary floating point unit 189a and DFU-decimal floating point unit 189b) are mostly "unaware" of which thread is executing in a given cycle. The ISU controls the allocation of physical registers to threads.

FIG. 1C also depicts other execution units, such as single-instruction multiple-data (SIMD) units or vector units 190. Other or different execution units may also be used.

Although various stages, registers and other components are described above, these are only examples. More, fewer or different stages, registers and/or components may be used without departing from a spirit of the present invention. Those provided above are just examples.

Figure 2A:
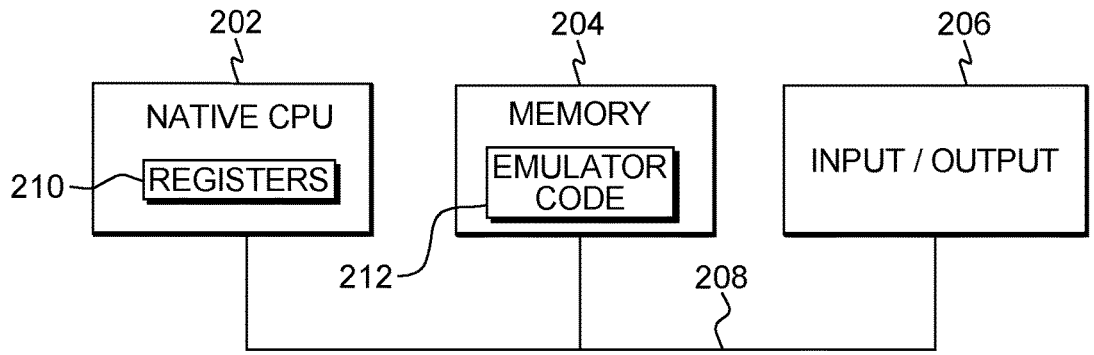
FIG. 2A depicts another example of a computing environment to incorporate and use one or more aspects of the present invention.

Another embodiment of a computing environment to incorporate and use one or more aspects is described with reference to FIG. 2A. In this example, a computing environment 200 includes, for instance, a native central processing unit (CPU) 202, a memory 204, and one or more input/output devices and/or interfaces 206 coupled to one another via, for example, one or more buses 208 and/or other connections. As examples, computing environment 200 may include a PowerPC processor or a pSeries server offered by International Business Machines Corporation, Armonk, N.Y.; and/or other machines based on architectures offered by International Business Machines Corporation, Intel, or other companies.

Native central processing unit 202 includes one or more native registers 210, such as one or more general purpose registers and/or one or more special purpose registers used during processing within the environment. These registers include information that represents the state of the environment at any particular point in time.

Moreover, native central processing unit 202 executes instructions and code that are stored in memory 204. In one particular example, the central processing unit executes emulator code 212 stored in memory 204. This code enables the computing environment configured in one architecture to emulate another architecture. For instance, emulator code 212 allows machines based on architectures other than the z/Architecture, such as PowerPC processors, pSeries servers, or other servers or processors, to emulate the z/Architecture and to execute software and instructions developed based on the z/Architecture.

Figure 2B:
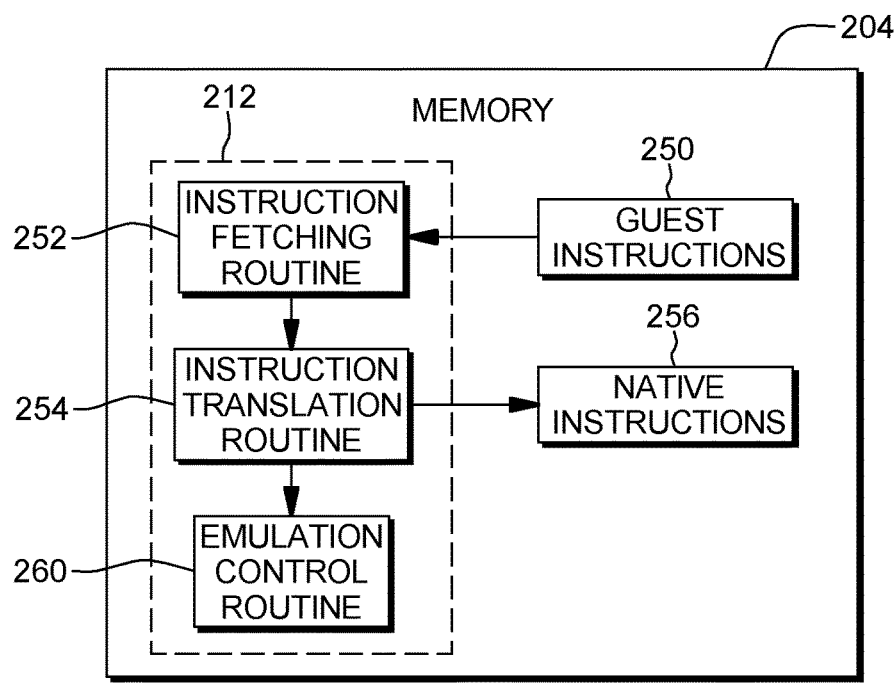
FIG. 2B depicts further details of the memory of FIG. 2A.

Further details relating to emulator code 212 are described with reference to FIG. 2B. Guest instructions 250 stored in memory 204 comprise software instructions (e.g., correlating to machine instructions) that were developed to be executed in an architecture other than that of native CPU 202. For example, guest instructions 250 may have been designed to execute on a z/Architecture processor, but instead, are being emulated on native CPU 202, which may be, for example, an Intel processor. In one example, emulator code 212 includes an instruction fetching routine 252 to obtain one or more guest instructions 250 from memory 204, and to optionally provide local buffering for the instructions obtained. It also includes an instruction translation routine 254 to determine the type of guest instruction that has been obtained and to translate the guest instruction into one or more corresponding native instructions 256. This translation includes, for instance, identifying the function to be performed by the guest instruction and choosing the native instruction(s) to perform that function.

Further, emulator code 212 includes an emulation control routine 260 to cause the native instructions to be executed. Emulation control routine 260 may cause native CPU 202 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 256 may include loading data into a register from memory 204; storing data back to memory from a register; or performing some type of arithmetic or logic operation, as determined by the translation routine.

Each routine is, for instance, implemented in software, which is stored in memory and executed by native central processing unit 202. In other examples, one or more of the routines or operations are implemented in firmware, hardware, software or some combination thereof. The registers of the emulated processor may be emulated using registers 210 of the native CPU or by using locations in memory 204. In embodiments, guest instructions 250, native instructions 256 and emulator code 212 may reside in the same memory or may be disbursed among different memory devices.

A guest instruction 250 that is obtained, translated and executed is, for instance, the Spin Loop Delay instruction. The instruction, which is of one architecture (e.g., the z/Architecture), is fetched from memory, translated and represented as a sequence of native instructions 256 of another architecture (e.g., PowerPC, pSeries, Intel, etc.). These native instructions are then executed.

Figure 3:
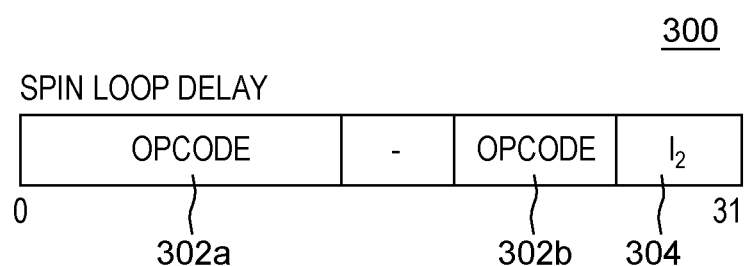
FIG. 3 depicts one example of a Spin Loop Delay instruction, in accordance with an aspect of the present invention.

One example of a Spin Loop Delay instruction is described with reference to FIG. 3. In one example, a Spin Loop Delay (SPNDLY) instruction 300 includes operation code (opcode) fields 302a, 302b that include an opcode indicating a spin loop delay operation, and an immediate field ($I_2$) 304 used to indicate one or more conditions to be satisfied. In one embodiment, the fields of the instruction are separate and independent from one another. However, in another embodiment, more than one field may be combined.

In one example, the $I_2$ field specifies a bit mask of one or more conditions that are to be checked. If any condition, that has, e.g., a '1' b in its mask, is satisfied, then dispatch of the instruction is allowed to proceed (the logical OR of conditions specified). Example mask bits are defined below. For those conditions that have an "!" in front of them, they are satisfied when they are false; for example, dispatch is delayed if BOPINPR (Broadcast Operation In Progress) is true, and dispatch is allowed when it is false.

| $I_2$ Bit | Function |
|---|---|
| 0:6 | <not defined> |
| 7 | TIMEDONE (0x6A) - Firmware Timer Done |
| 8 | !BOPINPR (0x55) - No Broadcast Operation in Progress |
| 9 | !BLKXLAT (0x6E) - No Blocking Translation |
| 10 | QUREQ (0x70) - Quiesce Request Received |
| 11 | QUPRIO (0x71) - Quiesce has Priority |
| 12 | QUFAST (0x7F) - Quiesce Fast Mode Request Active |
| 13 | COPDONE (0x66) - Co-processor Done |
| 14 | <not defined> |
| 15 | SYSDONE (0X60) OR SYSERR (0X62) - the logical OR of the two branchpoints - system operation done or had an error return code |

The above bit assignments and/or selected conditions are just examples. Other, more or fewer bit assignments and/or conditions to be checked may be provided without departing from the spirit of aspects of the invention.

In one embodiment, the instruction is not dispatched until any of the conditions specified in the $I_2$ field is met, or based on a timeout, e.g., a time limit is reached. The instruction is then dispatched and treated as a functional NOP (no-operation) for execution purposes. The intended use of this instruction, which is executed, e.g., by a thread 112 of processor 104, is to improve performance of the other thread(s) in the processor by not flooding the pipeline with this thread's looping instructions that are likely to continue to occur for some time.

Regardless of whether the conditions specified in the $I_2$ field are satisfied or not, the instruction is dispatched after, for instance, a fixed timeout period (also referred to as a specified amount of delay). This maximum delay is approximately 1024 processing cycles, in one embodiment. The timeout delay can be programmed to other values via, e.g., scan-only latches. There is also a scan-only latch which allows the instruction to dispatch immediately (e.g., after 1 cycle), regardless of the conditions being satisfied or the normal timeout value. If no mask bits in the $I_2$ field are specified ($I_2$ is zero), the dispatch is delayed until the timeout occurs.

In one example, the delay or timeout period is maintained in a control register accessible to the instruction.

The condition code is not changed by this instruction. Note that since the instruction can timeout regardless of whether the condition is satisfied, the specified branch point conditions are still tested, in one embodiment, following the SPNDLY instruction to determine if one or more conditions have been satisfied. This is accomplished by one or more branch instructions corresponding to the one or more conditions.

Further details regarding one implementation of the Spin Loop Delay instruction are described with reference to FIGS. 4A-4B. In particular, FIG. 4A depicts one example of a processing flow associated with one implementation of the Spin Loop Delay instruction, and FIG. 4B depicts one example of a processing pipeline.

Figure 4A:
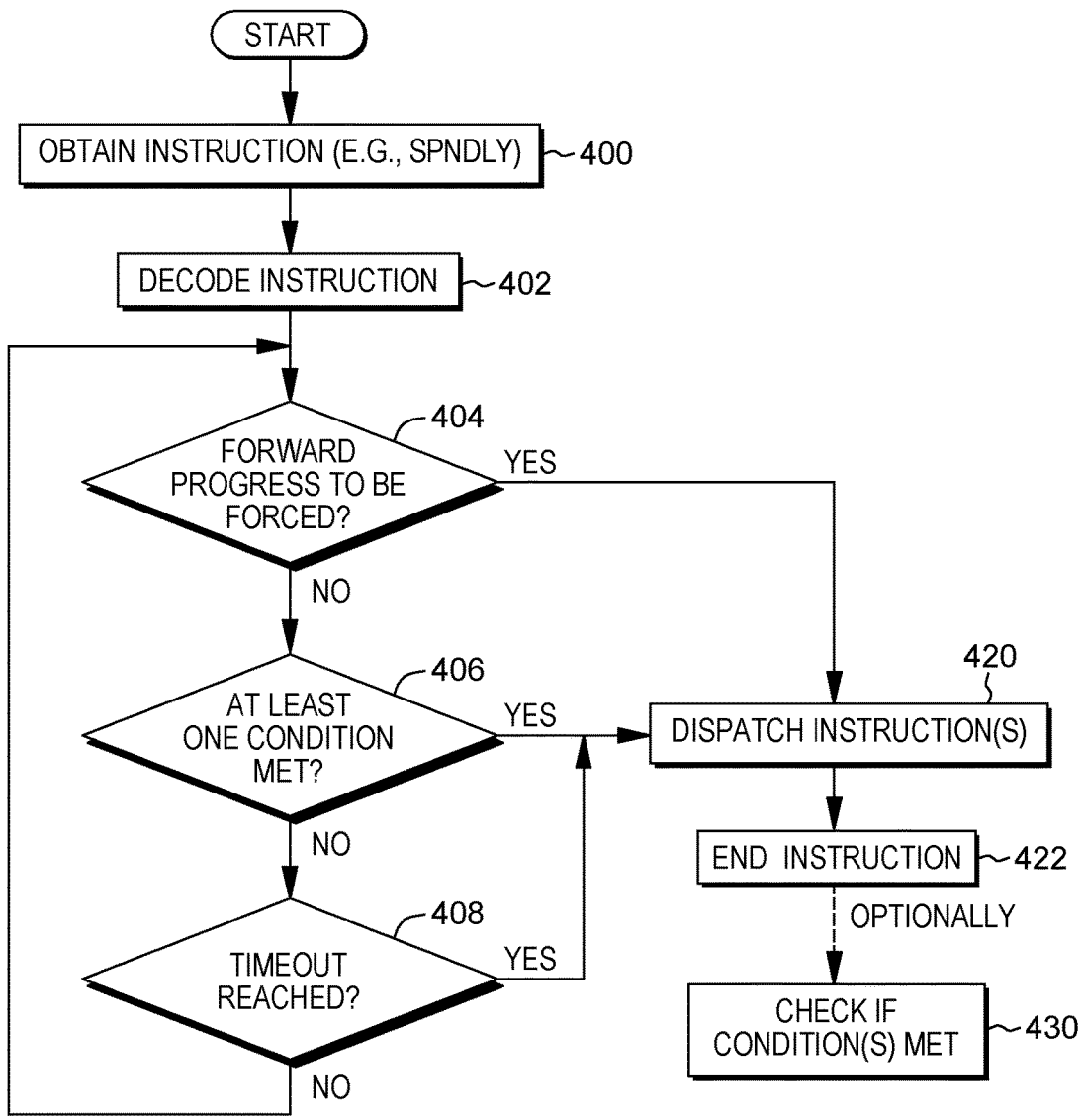
FIG. 4A depicts one example of processing associated with the Spin Loop Delay instruction of FIG. 3, in accordance with an aspect of the present invention.

Referring initially to FIG. 4A, an instruction, such as the Spin Loop Delay instruction, is obtained, STEP 400, and decoded, STEP 402. In one implementation, a determination is made as to whether dispatching is to be forced, since, e.g., forward progress is to be made on the thread executing this instruction, even though the instruction is architecturally defined to delay, INQUIRY 404. If dispatching is not to be forced, processing continues to INQUIRY 406.

At INQUIRY 406, a determination is made as to whether at least one condition specified by the instruction to be checked has been met. This determination is made by the decode unit receiving a signal that the condition has been met. If at least one condition has not been met, a determination is made as to whether there is a timeout, such as a specified amount of delay (e.g., 1024 processing cycles) has been reached or any other selected timeout criteria, INQUIRY 408. If there is no timeout, then processing continues with the checking (including INQUIRY 404, INQUIRY 406, and INQUIRY 408, one or more of which may be performed concurrently) while dispatching of the SPNDLY instruction, as well as subsequent instructions on this thread (i.e., the thread on which SPNDLY is to be dispatched) is delayed. This is depicted in FIG. 4B.

Figure 4B:
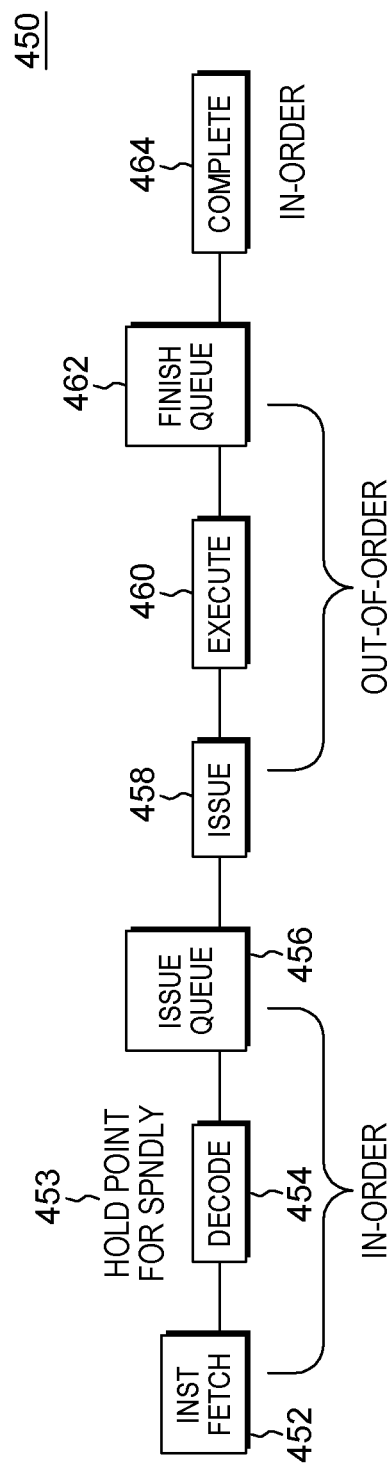
FIG. 4B depicts one example of processing stages in relation to the Spin Loop Delay instruction, in accordance with an aspect of the present invention.

As shown in FIG. 4B, in one example processing pipeline 450, the instruction is fetched 452 and decoded at 454. This is the delay or hold point 453 for the instruction, as described above.

Returning to FIG. 4A, processing continues with the checks. At INQUIRY 404, if forward progress is to be forced and the delay is not to occur or is no longer to occur, the instruction is dispatched, STEP 420, as well as any subsequent instructions on the thread.

As shown in FIG. 4B, the instruction is placed on an issue queue 456 and subsequently issued 458. It is executed 460 and placed on a finish queue 462. It then is taken from the finish queue in due time and completed 464. In this example of the forced progress, it is indicated that completion was successful, even though the instruction did not perform as defined or expected.

Returning to FIG. 4A, the instruction completes, STEP 422. Subsequently, in one implementation, the one or more conditions specified by the instruction are checked via one or more branch instructions, STEP 430. This is because, e.g., the instruction may have timed-out or been forced to dispatch. In another implementation, this test may not occur.

Additionally, at INQUIRY 406, if at least one condition is met, or at INQUIRY 408, if there is a timeout, the instruction and any subsequent instructions are dispatched, STEP 420, and processing is performed, as described above.

As described herein, firmware can use this instruction to select one or more conditions to wait on rather than constantly looping and testing these conditions.

An alternative to the implementation of the instruction described above is to have one or more fixed bits defined like above and have a variable condition of, e.g., the 128 testable conditions be selected by a 7 bit field, as an example. This would allow more wait loops to be replaced by the SPNDLY instruction.

One or more aspects of the present invention are inextricably tied to computer technology, and improve system performance. For instance, the SPINDLY instruction reduces resource hogging by a waiting thread, which helps performance of one or more other threads. It also makes debugging easier, since a spin loop does not fill the list of executed instructions.

In one implementation, if the processor is trying to make forward progress, then the timeout feature may be short-circuited so that the one or more other threads that are doing real work are not delayed by the SPNDLY thread.

Many variations are possible.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 5:
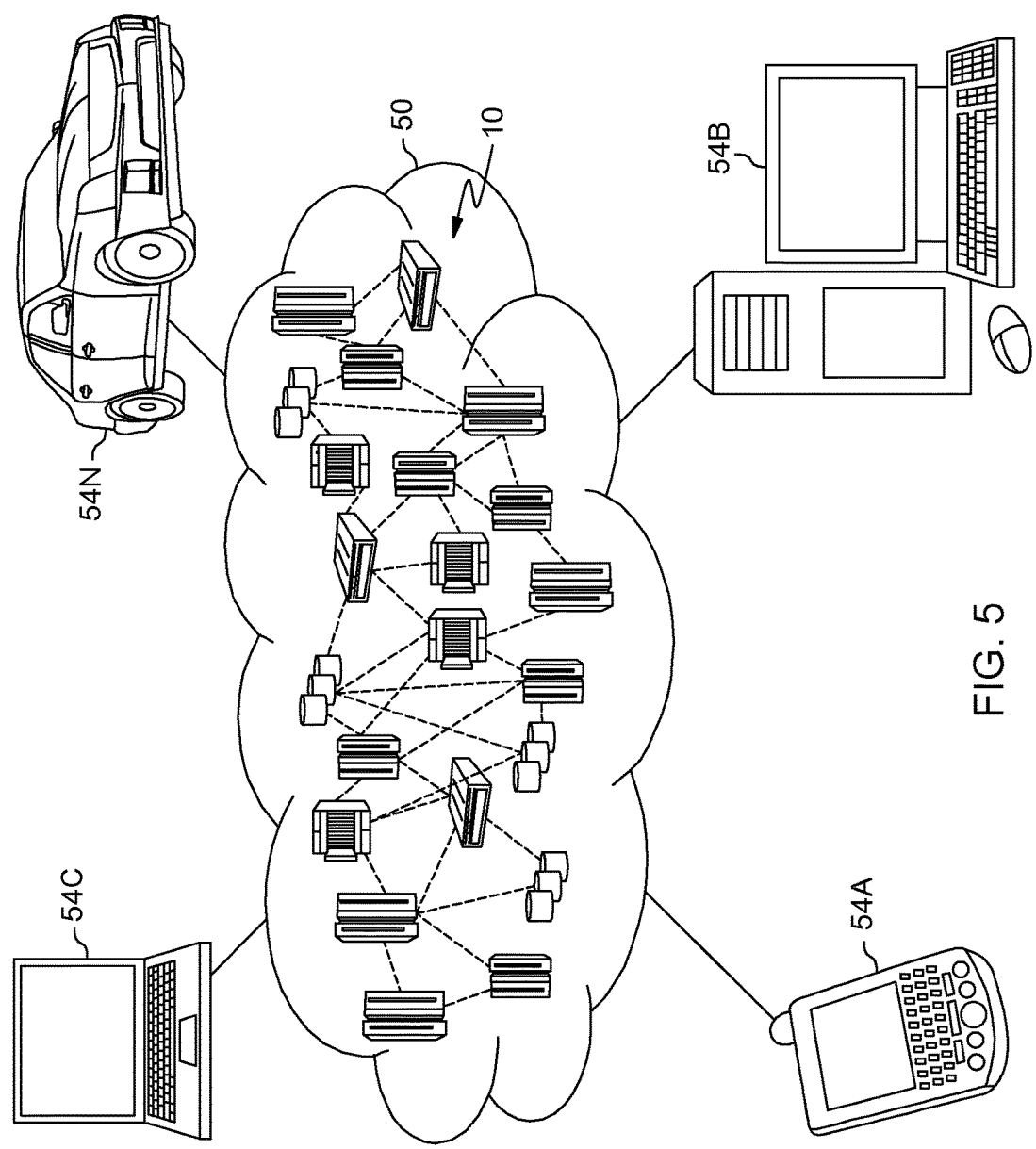
FIG. 5 depicts one embodiment of a cloud computing environment.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
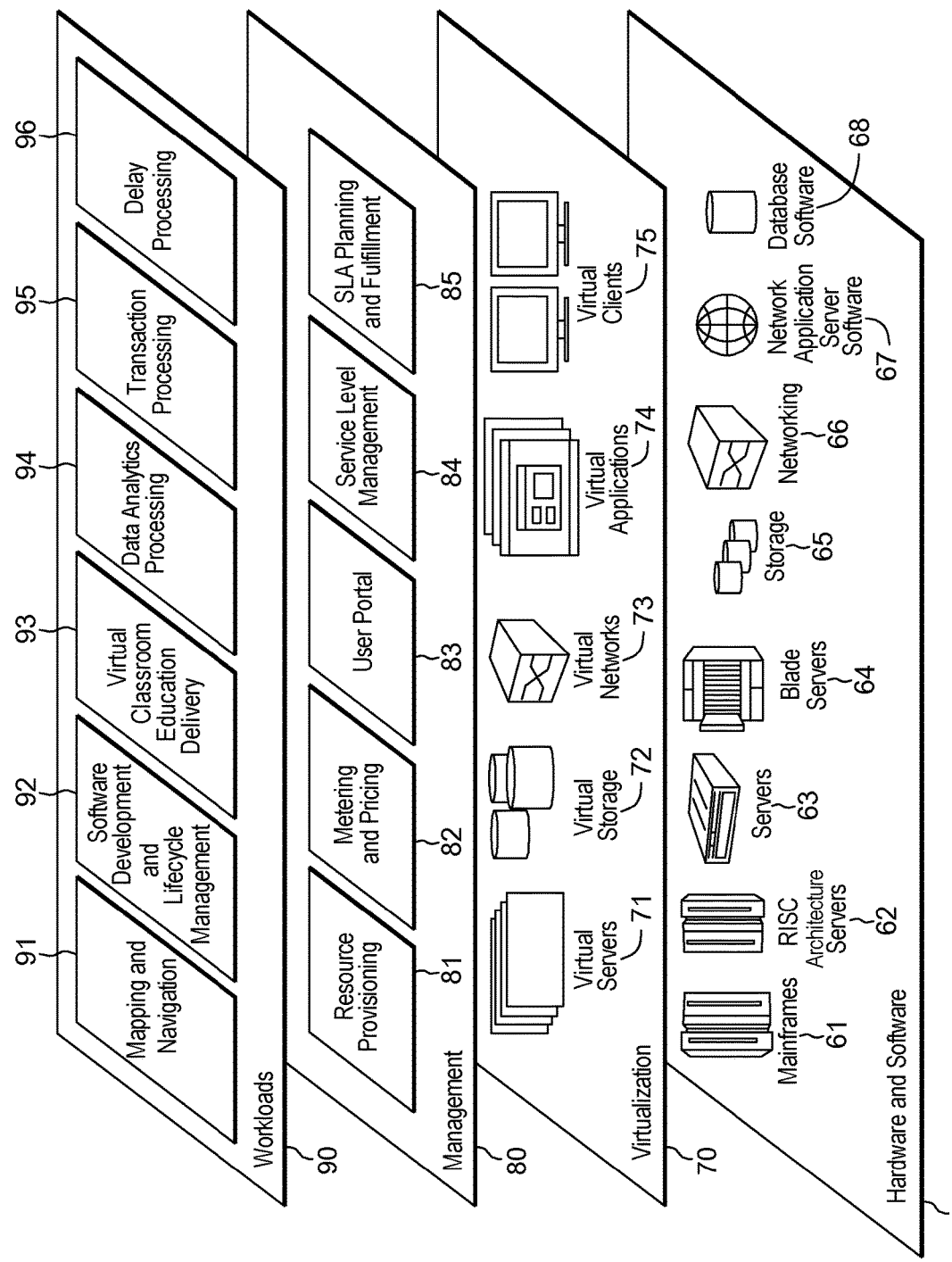
FIG. 6 depicts one example of abstraction model layers.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and delay processing 96.

One or more aspects of the present invention are inextricably tied to computer technology and facilitate processing within a computer, improving performance thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of facilitating processing within a computing environment, said computer-implemented method comprising:
    decoding an instruction defined to be delayed, the instruction having a field associated therewith that indicates one or more conditions to be checked;
    delaying dispatching of the instruction;
    dispatching the instruction based on a timeout, provided the instruction has not been previously dispatched based on meeting at least one condition of the one or more conditions to be checked;
    determining that forward progress is to be made for a thread on which the instruction is to be dispatched; and
    dispatching, based on determining that forward progress is to be made, the instruction prior to the timeout or waiting for the at least one condition to be met to force completion of the instruction.

2. The computer-implemented method of claim 1, wherein the one or more conditions comprise a time done condition, no broadcast operation in progress, no blocking translation, quiesce request received, quiesce has priority, quiesce fast mode request active, co-processor done, system operation done and error return code.

3. The computer-implemented method of claim 1, wherein the timeout comprises reaching a specified amount of delay, the specified amount of delay comprising a number of processing cycles.

4. The computer-implemented method of claim 3, wherein the number of processing cycles is provided in a register accessible by the instruction.

5. The computer-implemented method of claim 1, wherein the field is an immediate field of the instruction, the immediate field including at least one or more indicators for the at least one or more conditions, and wherein a set indicator indicates a condition corresponding thereto is to be checked.

6. The computer-implemented method of claim 1, further comprising checking the one or more conditions, based on dispatching the instruction prior to the timeout or meeting the at least one condition.

7. The computer-implemented method of claim 1, further comprising:
 executing the instruction to completion, the executing comprising executing the instruction as a no-operation and indicating successful completion although the instruction did not delay as defined.

8. The computer-implemented method of claim 1, wherein the instruction comprises at least one operation code field to indicate a spin delay operation and an immediate field to indicate the one or more conditions to be checked.

9. The computer-implemented method of claim 1, further comprising checking the one or more conditions subsequent to completion of the instruction.

* * * * *